US012276982B2

(12) United States Patent
Han et al.

(10) Patent No.: US 12,276,982 B2
(45) Date of Patent: Apr. 15, 2025

(54) SENSOR LAYOUT TECHNIQUES

(71) Applicant: TuSimple, Inc., San Diego, CA (US)

(72) Inventors: Xiaoling Han, San Diego, CA (US); Chenzhe Qian, San Diego, CA (US); Chiyu Zhang, Tucson, AZ (US); Charles A. Price, San Diego, CA (US); Joshua Miguel Rodriguez, Tucson, AZ (US); Lei Nie, Tucson, AZ (US); Lingting Ge, San Diego, CA (US); Panqu Wang, San Diego, CA (US); Pengfei Chen, San Diego, CA (US); Shuhan Yang, Tucson, AZ (US); Xiangchen Zhao, San Diego, CA (US); Xiaodi Hou, San Diego, CA (US); Zehua Huang, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 0 days.

(21) Appl. No.: 18/167,993

(22) Filed: Feb. 13, 2023

(65) Prior Publication Data

US 2023/0266759 A1 Aug. 24, 2023

Related U.S. Application Data

(60) Provisional application No. 63/268,258, filed on Feb. 18, 2022.

(51) Int. Cl.
*B60W 50/023* (2012.01)
*G05D 1/00* (2006.01)

(52) U.S. Cl.
CPC .................. *G05D 1/0088* (2013.01)

(58) Field of Classification Search
CPC .............. G05D 1/0088; G05D 2201/0213
See application file for complete search history.

(56) References Cited

U.S. PATENT DOCUMENTS 10,599,155 B1 * 3/2020 Konrardy ............... G06N 3/045
11,076,109 B2 7/2021 Nie
(Continued)

FOREIGN PATENT DOCUMENTS

EP 3882100 A1 9/2021
EP 3929051 A2 * 12/2021 .......... B60W 50/023
(Continued)

OTHER PUBLICATIONS

European Patent Office, Extended European Search Report for Appl. No. 23155472.6, mailed Jun. 19, 2023, 9 pages.

*Primary Examiner* — Hitesh Patel
*Assistant Examiner* — Michael Lukon
(74) *Attorney, Agent, or Firm* — Perkins Coie LLP

(57) ABSTRACT

A system installed in a vehicle includes a first group of sensing devices configured to allow a first level of autonomous operation of the vehicle; a second group of sensing devices configured to allow a second level of autonomous operation of the vehicle, the second group of sensing devices including primary sensing devices and backup sensing devices; a third group of sensing devices configured to allow the vehicle to perform a safe stop maneuver; and a control element communicatively coupled to the first group of sensing devices, the second group of sensing devices, and the third group of sensing devices. The control element is configured to: receive data from at least one of the first group, the second group, or the third group of sensing devices, and provide a control signal to a sensing device based on categorization information indicating a group to which the sensing device belongs.

19 Claims, 15 Drawing Sheets

(56) References Cited

U.S. PATENT DOCUMENTS

| | | | |
|---|---|---|---|
| 2020/0180653 A1* | 6/2020 | Chi | B60W 60/00186 |
| 2020/0334099 A1 | 10/2020 | Hayes et al. | |
| 2022/0126878 A1* | 4/2022 | Moustafa | G08G 1/096741 |

FOREIGN PATENT DOCUMENTS

| | | | | |
|---|---|---|---|---|
| JP | 2004175204 A | * | 6/2004 | |
| WO | WO-2019006021 A1 | * | 1/2019 | G01S 13/865 |
| WO | WO-2020096830 A1 | * | 5/2020 | B60W 30/14 |
| WO | 2020123135 A1 | | 6/2020 | |
| WO | WO-2021042268 A1 | * | 3/2021 | B60R 16/033 |

* cited by examiner

Camera Summary

| NO. 402 | NO. 404 | Name | Type and range 420 | Location | Use cases | Priority 410 |
|---|---|---|---|---|---|---|
| 1 | 31 | Front | S | Roof rack | Front perception, for highway, surface street, and merge-in traffic interaction | High, O-Sub |
| 3 | 33 | Front | M | Roof rack | Front perception, for highway and surface street driving | High, O-Sub |
| 4 (4a) | | Front stereo right | L | Roof rack | Long range front perception, Cam #4 and #17 forms a long range stereo system and backup for each other | High, O-Sub |
| 17 (4b) | | Front stereo left | L | Roof rack | Long range front perception, Cam #4 and #17 forms a long range stereo system and backup for each other | High, P-Sub |
| 5 | | Front left | M | Roof rack | Left side-front perception, mainly for highway entrance and ramp merge-in | High, P-Sub |
| 2 | 32 | Front right | M | Roof rack | Right side-front perception, mainly for interactions with merge-in traffic | High, O-Sub |
| 6 | | Left | M | Roof rack | Side perception, mainly for surface street intersections | High, P-Sub |
| 7 | | Right | M | Roof rack | Side perception, mainly for surface street intersections | High, P-Sub |
| 8 | 38 | Left rear | M | Side rack | Rear perception, mainly for lane changing | High, O-Sub |
| 9 | 39 | Right rear | M | Side rack | Rear perception, mainly for lane changing | High, P-Sub |
| 50 | | Front | Infrared L | Roof rack | Front perception at night time | High, P-Sub |
| 51 | | Right rear | Infrared M | Side rack | Rear perception at night time for lane changing | High, P-Sub |
| 52 | | Left rear | Infrared M | Side rack | Rear perception at night time for lane changing | High, P-Sub |
| 21 | | Near range right | Fisheye | Roof rack | Near range sensing mainly for extremely close by traffic lights (e.g. traffic control signal light at the on-ramp) | Medium, P-Sub |
| 22 | | Near range left | Fisheye | Roof rack | Near range sensing mainly for extremely close by traffic lights (e.g. traffic control signal light at the on-ramp) | Medium, P-Sub |
| 24 | | Cabin camera | Fisheye | Cabin | Cabin monitoring | Medium, P-Sub |

FIG. 4

LiDAR Summary

| NO. | NO. r | Name | Type and range | Location | Use cases | Priority 610 |
|---|---|---|---|---|---|---|
| 1 | | Left | Spinning/Solid | Left Engine Mirror | Primary surrounding detection | High, O-Sub |
| 2 | | Right | Spinning/Solid | Right Engine Mirror | Primary surrounding detection | High, O-Sub |
| 3 | | Front long range | FMCW | Central of roof rack | Long range front perception | High, P-Sub |
| | 4 | rLeft | Spinning/Solid | Side panel | Backup surround perception, enhanced rear perception | High, backup of 1 |
| | 5 | rRight | Spinning/Solid | Side panel | Backup surround perception, enhanced rear perception | High, backup of 2 |
| 6 | | Left Rear long range | Solid state | Side rack | Rear perception for lane changing | High, P-Sub |
| 7 | | Right Rear long range | Solid state | Side rack | Rear perception for lane changing | High, P-Sub |
| 8 | | Front near range | Spinning/Solid | Front ~ 0.5-1m high | Near range blind-spot perception | High, P-Sub |
| 9 | | Left near range | Spinning/Solid | Side ~ 0.5-1m high | Near range blind-spot perception | High, P-Sub |
| 10 | | Right near range | Spinning/Solid | Side ~ 0.5-1m high | Near range blind-spot perception | High, P-Sub |

FIG. 6

Radar Summary

| NO. | NO.r | Name | Type and range | Location | Use cases | Priority |
|---|---|---|---|---|---|---|
| 0 | | Left | Image | Bumper or roof | Left object detection | High, P-Sub |
| 1 | | Front | Image/2D | Bumper or roof | Front object detection | High, P-Sub |
| 2 | | Right | Image/2D | Bumper or roof | Right object detection | High, P-Sub |
| 3 | | Left rear | Image/2D | Bumper or roof | Rear object detection | High, P-Sub |
| 4 | | Right rear | Image/2D | Bumper or roof | Rear object detection | High, P-Sub |
| 5 | | Rear | Image | Rear perception housing | Rear object detection | High, P-Sub |

SENSOR LAYOUT TECHNIQUES

CROSS-REFERENCE TO RELATED APPLICATIONS

This document claims priority to and benefits of U.S. Patent Application No. 63/268,258, filed on Feb. 18, 2022. The aforementioned application of which is incorporated by reference in its entirety.

TECHNICAL FIELD

This document relates to tools (systems, apparatuses, methodologies, computer program products, etc.) for semi-autonomous and autonomous control of vehicles, and more particularly, a sensor system for autonomous vehicles.

BACKGROUND

Autonomous vehicle navigation is a technology for sensing the position and movement of a vehicle; and, based on the sensing, autonomously controlling the vehicle to navigate towards a destination. Autonomous vehicle navigation can have important applications in transportation of people, goods and services. In order to ensure the safety of the vehicle, as well as people and property in the vicinity of the vehicle, autonomous algorithms implemented by these applications, various measurement data is obtained.

SUMMARY

Disclosed are devices, systems and methods for a vehicle having a sensor system including sensors that are classified as corresponding layers. Based on sensor classifications as suggested in the disclosed technology, it is possible to provide a more efficient sensor system while securing a safety.

In one aspect, a system installed in a vehicle is provided to comprise: a first group of sensing devices configured to allow a first level of autonomous operation of the vehicle; a second group of sensing devices configured to allow a second level of autonomous operation of the vehicle, the second group of sensing devices including primary sensing devices and backup sensing devices; a third group of sensing devices configured to allow the vehicle to perform a safe stop maneuver; and a control element communicatively coupled to the first group of sensing devices, the second group of sensing devices, and the third group of sensing devices. The control element is configured to: receive data from at least one of the first group of sensing devices, the second group of sensing devices, and the third group of sensing devices, and provide a control signal to a sensing device based on categorization information indicating a group to which the sensing device belongs.

In another aspect, a system installed in a vehicle, comprising: a first group of sensing devices configured to allow N autonomous maneuvers operable during an operation of the vehicle, N being a natural number; a second group of sensing devices configured to allow M autonomous maneuvers operable during the operation of the vehicle, M being a natural number that is less than N; a third group of sensing devices including a vehicle control logic configured to detect an occurrence of a failure in at least one of the first group of sensing devices and the second group of sensing devices and allow the vehicle to perform a safe stop maneuver; and a control element communicatively coupled to the first group of sensing devices, the second group of sensing devices, and the third group of sensing devices, the control element being configured to provide a control signal to a sensing device based on categorization information indicating a group to which the sensing device belongs.

In another aspect, a computer-implemented method for assisting in operating a vehicle, comprising: receiving data from at least one of a first group of sensing devices, a second group of sensing devices, and a third group of sensing devices that are installed on the vehicle and categorized to allow different levels of autonomous operation of the vehicle; and providing a control signal to a sensing device based on categorization information indicating a group to which the sensing device belongs, and wherein the first group of sensing devices include first sensing devices that operate to accomplish a relatively higher level of autonomous operation of the vehicle, the second group of sensing devices include second sensing devices that operate to accomplish a relatively lower level of autonomous operation of the vehicle, and the third group of sensing devices include third sensing devices that operate to perform a safe stop maneuver.

In another exemplary aspect, the above-described method is embodied in a non-transitory computer readable storage medium. The non-transitory computer readable storage medium includes code that when executed by a processor, causes the processor to perform the methods described in this patent document.

In yet another exemplary embodiment, a device that is configured or operable to perform the above-described methods is disclosed.

The above and other aspects and features of the disclosed technology are described in greater detail in the drawings, the description and the claims.

BRIEF DESCRIPTION OF THE DRAWINGS

FIG. 4 shows an example table including classification information of cameras located at the vehicle based on some implementations of the disclosed technology.

FIG. 6 shows an example table including classification information of LiDAR (light detection and ranging) devices located at the vehicle based on some implementations of the disclosed technology.

FIG. 8 shows an example table including classification information of radars located at the vehicle based on some implementations of the disclosed technology.

DETAILED DESCRIPTION

The transportation industry has been undergoing considerable changes in the way technology is used to control the operation of a vehicle. A vehicle is provided with various sensors. With the significant advancement of sensor and communication technology and the reliable application of obstacle detection techniques and algorithms, automated driving is becoming a pivotal technology that can revolutionize the future of transportation and mobility. Sensors are fundamental to the perception of vehicle surroundings in an automated driving system, and the use and performance of multiple integrated sensors can directly determine the safety and feasibility of automated driving vehicles.

Figure 1:
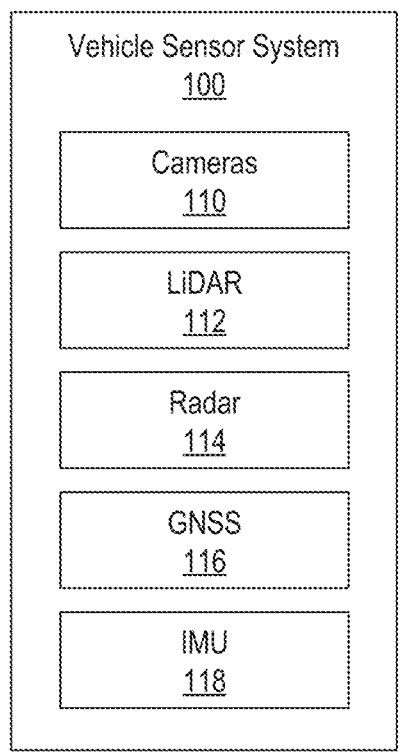
FIG. 1 shows a block diagram of a vehicle sensor system in which a sensor layout can be implemented.

Various implementations of the disclosed technology may provide an effective sensor layout by classifying sensors according to corresponding layers. FIG. 1 shows a block diagram of a vehicle sensor system 100 in which an optimized sensor layout can be implemented. The vehicle sensor system 100 may include a number of sensors configured to sense information about an environment or condition of the vehicle. The sensors can refer to any devices capable of detecting the environment or the condition of the vehicle and providing electronic signals based on the detection. For example, the vehicle sensor system 100 may include imaging devices such as cameras 110, LiDAR devices 112 configured to measure a distance between the vehicle and an object, radars 114 configured to measure velocity and distance of an object, GNSSs (global navigation satellite systems) 116 configured to compute position, time and/or velocity using satellites, IMUs (inertial measurement units) 118 configured to sense position and orientation changes of the vehicle. The sensor system can include other environmental sensing devices.

The suggested sensor layout classifies sensors located in the vehicle as corresponding to layers such that the sensors in a same layer operate together to perform desired functions of the corresponding layer. The sensor layout can be managed to support various levels of vehicle control and/or operation corresponding to a level of autonomy associated with a vehicle. The levels of autonomous driving have been classified into different levels of automation, for example, ranging from Level 0 to Level 5. For instance, at Level 0, or fully-manual driving operations, a driver (e.g., a human driver) may be responsible for all the driving control operations (e.g., steering, accelerating, braking, etc.) associated with the vehicle. Level 0 may be referred to as a "No Automation" level. At Level 1, the vehicle may be responsible for a limited number of the driving operations associated with the vehicle, while the driver is still responsible for most driving control operations. An example of a Level 1 vehicle may include a vehicle in which the throttle control and/or braking operations may be controlled by the vehicle (e.g., cruise control operations, etc.). Level 1 may be referred to as a "Driver Assistance" level. At Level 2, the vehicle may collect information (e.g., via one or more driving assistance systems, sensors, etc.) about an environment of the vehicle (e.g., surrounding area, roadway, traffic, ambient conditions, etc.) and use the collected information to control driving operations (e.g., steering, accelerating, braking, etc.) associated with the vehicle. In a Level 2 autonomous vehicle, the driver may be required to perform other aspects of driving operations not controlled by the vehicle. Level 2 may be referred to as a "Partial Automation" level. It should be appreciated that Levels 0-2 all involve the driver monitoring the driving operations of the vehicle.

At Level 3, the driver may be separated from controlling all the driving operations of the vehicle except when the vehicle makes a request for the operator to act or intervene in controlling one or more driving operations. In other words, the driver may be separated from controlling the vehicle unless the driver is required to take over for the vehicle. Level 3 may be referred to as a "Conditional Automation" level. At Level 4, the driver may be separated from controlling all the driving operations of the vehicle and the vehicle may control driving operations even when a user fails to respond to a request to intervene. Level 4 may be referred to as a "High Automation" level. At Level 5, the vehicle can control all the driving operations associated with the vehicle in all driving modes. The vehicle in Level 5 may continually monitor traffic, vehicular, roadway, and/or environmental conditions while driving the vehicle. In Level 5, there is no human driver interaction required in any driving mode. Accordingly, Level 5 may be referred to as a "Full Automation" level. It should be appreciated that in Levels 3-5 the vehicle, and/or one or more automated driving systems associated with the vehicle, monitors the driving operations of the vehicle and the driving environment.

In some implementations, the suggested sensor layout can classify sensors to accomplish different levels of automation of the vehicle. For example, the suggested sensor layout can classify sensors into different groups that are configured to different levels of automation of the vehicle and provide control signal to corresponding sensors based on information indicating which group a sensor belongs. Since the sensor layout involves classifying sensors, the layout information can be referred to as the classification information. In some implementations, the suggested sensor layout can support an emergency handling system of the vehicle to ensure the safe driving of the vehicle. For example, a vehicle can be equipped with sensors that detect an abnormality to allow the vehicle to safely stop driving and ask for assistance.

Figure 2:
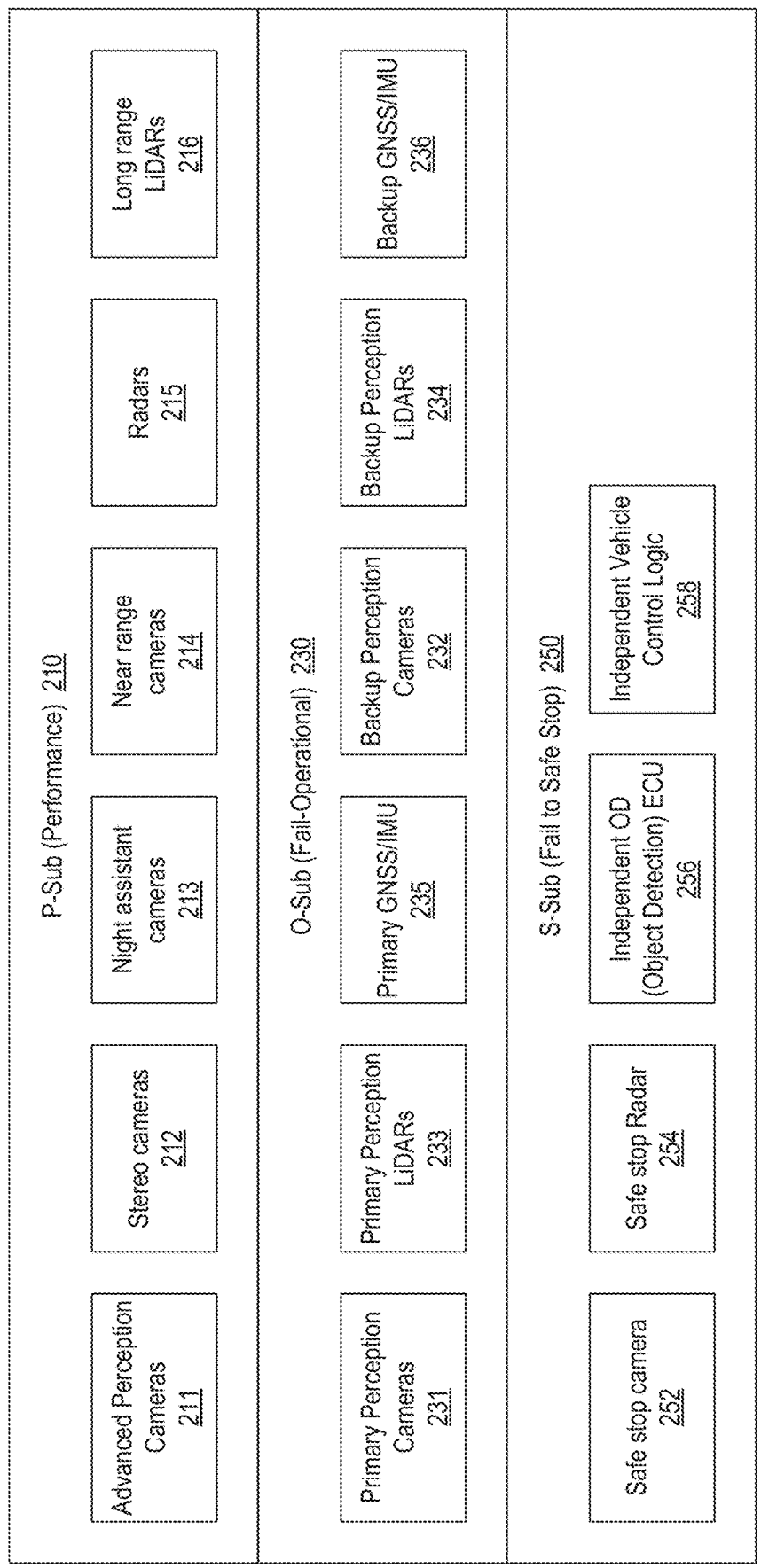
FIG. 2 shows an example of a schematic diagram that illustrates a sensor layout for a sensor system in a vehicle based on some implementations of the disclosed technology.

FIG. 2 shows an example of a schematic diagram that illustrates a sensor layout for a sensor system in a vehicle. In this patent document, as an example, a vehicle is capable of an autonomous operation but the disclosed technology is not limited thereto. For example, the vehicle can be semi-autonomous. The vehicle can be implemented in cars, motorcycles, buses, boats, trucks, airplanes, or robot devices. In some implementations, the level of automation of the vehicle can depend on which group of sensors are allowed to operate. A control system can be provided in the vehicle to provide control signals to corresponding sensors to implement different levels of automation of the vehicle and/or an emergency stop based on data received from the sensors.

The disclosed technology suggests classifying the sensors in the vehicle to two or more groups to provide a sensor system with high level of performance and safety. Referring to FIG. 2, the sensor system may be configured as three layers. For example, the system may be configured as a performance layer (e.g., P-sub layer) 210, an operational layer (e.g., O-sub layer) 230, and a safety layer (e.g., S-sub layer) 250. In the present implementation, various sensors in the vehicle are classified as the performance layer 210, the O-sub layer 230, and the safety layer 250 depending on operations/functions of the sensors. Each layer of the sensor system may have a different role in assisting the driving of the vehicle, which will be further discussed in the below. While the sensor system shown in FIG. 2 has three layers, the sensor system can be configured to include any number of layers. Each block in the respective sub layer as shown in FIG. 2 may correspond to logical separations of the sensors. Thus, in some implementations, one physical sensor can operate as one more blocks as shown in FIG. 2.

The performance layer 210 may include a sensor suite which can enhance a certain domain, e.g., high accuracy long-range perception and full maneuverability. In the example of FIG. 2, the performance layer 210 includes cameras 211, 212, 213, 214, radars 215, and a long range LiDAR device 216. Examples of cameras include one or more advanced perception cameras 211, one or more stereo cameras 212, one or more night assistant cameras 213, one or more near range cameras 214. In the case of a sensor failure in the performance layer 210, it is still possible to maintain a certain level of autonomy and bring the vehicle to its destination safely and without assistance or rescue. The conditions for detecting the sensor failure in the performance layer 210 can be predetermined and stored in a corresponding control unit. The sensors included in the performance layer 210 may be referred to as performance sensors in the sensor system and provide some additional functions of the sensor system.

For example, the sensors included in the performance layer 210 can be configured to assist the lane changing function during a lane changing maneuver. The vehicle may perform the lane changing maneuver in a manner that may be associated with a degree of aggressiveness. For example, the vehicle may perform the lane change maneuver in a conservative manner or an aggressive manner. To perform the lane change maneuver in an aggressive manner, the vehicle may rely on one or more performance sensors that help provide a better understanding of nearby vehicles and/or approaching traffic. With the additional data from the performance sensors, a better detection of the approaching traffic can be made and thus the lane change maneuver can occur in the more aggressive manner. The performance sensors included in the performance layer 210 can include advanced perception cameras 211, stereo cameras 212, night assistant cameras 213, near range cameras 214, LiDARs 216, and/or radars 215. The performance sensors in the performance layer 210 may be used to improve the performance of the vehicle. Stereo cameras 212 may be configured to simultaneously photograph an object from a plurality of different directions using two cameras in the same manner as the principle that a person views an object and measure information in the depth direction from the position information. Night assistant cameras 213 may be configured to detect infrared wavelengths and convert the infrared wavelengths into electronic signals. Near range cameras 214 may be configured to provide view of the vehicle's surroundings in the near range, for example, 0.1 to 30 meters. The performance layer 210 may include other sensors, including, for example, wind sensors, and light sensors. When the sensors in the performance layer 210 are operating, the vehicle may have high accuracy, long range (e.g., 50 m to 1000 m) perception and may be capable of performing a full range of maneuvers, including accelerating, decelerating, cruising, turning, detecting other objects, and avoiding other objects.

The vehicle may use the sensors included in the operational layer (O-sub layer) 230 as the primary perception layer during a fail-operational mode. The sensors in the operational layer 230 may allow the vehicle to operate at a minimal operational level. The operational layer may include redundant sensors, including both primary sensors and one or more back-up sensors. Since each block in the layers of the sensor system corresponds to the logical separation of the sensors, the single sensor can perform the operations as the performance layer and/or the operational layer based on the control signals. For example, a single camera can operate as either the advanced perception camera or the primary perception camera based on the control signal. The control signal can instruct a corresponding sensor which operation the corresponding sensor performs, e.g., either one as required for the performance layer or the other one as required for the operational layer, by providing categorization information indicating a layer of the sensor system to which the corresponding sensor belongs.

In the example of FIG. 2, the operational layer 230 includes primary perception cameras 231, back-up perception cameras 232, primary perception LiDAR devices 233, back-up perception LiDAR devices 234, primary GNSS/IMUs (global navigation satellite system/inertial measurement unit) 235, and back-up GNSS/IMUs 236. In some implementations, the GNSS/IMU may correspond to an integrated unit of the GNSS and the IMU. Alternatively, in some implementations, the GNSS and the IMU can be separately implemented from each other. If a primary sensor fails, the vehicle may use one or more backup sensors to continue operation. The back-up perception cameras 232, the back-up perception LiDAR devices 234, and the back-up GNSS/IMU 236 may operate at the time of occurrence of an error of the primary sensors. With the redundancy of the sensors in the operational layer 230, even if a sensor failure occurs in the operational layer, the vehicle may continue operating but certain maneuvers may be avoided or limited. For example, if a primary sensor fails, the vehicle may use a backup sensor to continue operating, but the vehicle may operate at a reduced speed, avoid changing lanes, or avoid driving on surface streets. When the sensors of the performance layer 210 allow N autonomous maneuvers during the operation of the vehicle, the sensors of the operational layer 230 allow M autonomous maneuvers during the operation of the vehicle, whereby N and M are natural numbers and M is less than N. In the implementations, the performance layer 210 and the operation layer 230 are configured to allow different number of autonomous maneuvers during the operation of the vehicle. Configuring different layers of sensors that perform different number of autonomous maneuvers can help to support various levels of vehicle control and/or operation.

The safety layer (S-sub layer) 250 includes sensors needed to perform a safe stop maneuver. The vehicle may use the sensors in the safety layer to safely stop the vehicle on or next to the roadway, e.g., in the lane or on the shoulder. In the example of FIG. 2, the safety layer 250 includes a safe stop camera 252, a safe stop radar 254, an independent OD (object detection) ECU (electronic control unit) 256, and independent vehicle control logic (IVCL) 258. The vehicle may use the sensors and components included in the safety layer to decide whether to perform a safe stop maneuver. As being included in the safety layer 250 to make a stop decision or pull over decision for the vehicle, in the example, the safe stop camera 252 and the safe stop radar 254 may correspond to a front-looking camera and a front-looking radar, respectively. The vehicle may use the independent OD (object detection) ECU 256 included in the safety layer to perform stand-alone object detection. With the independent OD ECU 256, the vehicle may retain the ability to safely stop or pull over in the event of a failure by the sensors in the performance layer 210 and/or operational layer 230. The IVCL 258 may be configured to bring the vehicle to a safe stop in response to a failure condition. For example, if the IVCL 258 determines that a failure has occurred in the performance layer or the operational layer based on predetermined rules, IVCL 258 may bring the vehicle to a safe stop on the shoulder of the road and issue a request for emergency assistance. The request for emergency assistance may be sent to a service provider, such as a fleet management facility, law enforcement, or a repair service. The request for emergency assistance may include a vehicle identifier and the current position of the vehicle. The IVCL 258 can include software/formalized applications to perform the operations including determining the occurrence of the failure, bringing the vehicle to a safe stop, and issuing the emergency assistance request.

Various implementations can be made to configure the performance layer 210, the operational layer 230, and the safety layer 250. In some example embodiments, the proposed sensor layout, multiple sensors including cameras, LiDAR devices, radars, and GNSS/IMU, are classified according to corresponding layers. In some implementations, each of the performance layer 210 and the operation layer 230 may include a distinct vehicle control unit (VCU). The performance layer VCU may monitor performances of sensors included in the performance layer 210 and determine a failure based on predetermined rules. The operation layer VCU may monitor the performance layer VCU. If the operation layer VCU detects a failure of the performance layer VCU, the operation layer VCU may take over control of the vehicle. In some implementations, the independent vehicle control logic (IVCL) of the safety layer 250 may monitor the performance layer VCU and/or the operation layer VCU. If the safety layer IVCL detects a failure of either or both VCUs, the safety layer IVCL may take over control of the vehicle in order to bring it to a safe stop. In some example implementations, the VCUs in the performance layer 210 and the operation layer 230 and the IVCL in the safety layer 250 may operate the autonomous vehicle in a performance mode, an operation mode, or a safety mode, depending on the availability of sensors in each of the corresponding layers. In some implementations, the performance layer VCU may operate the autonomous vehicle (AV) in the performance mode as long as at least one sensor of each type is operating in the vehicle. If a sensor failure occurs in the performance layer 210, the performance layer VCU may switch to the operation mode. If a primary sensor and its backup sensor fail in the operation layer 230, the operational layer VCU may switch to the safety mode. This may allow the AV to continue operating as long as a minimum subset of sensors are available to allow safe operation at in either the performance mode or the operation mode. If the minimums subset of sensors is not available, the VCUs and/or the safety layer IVCL may bring the AV to a safe stop. In some other implementations, the VCUs in the performance layer 210 and the operational layer 230, and the IVCL in the safety layer 250 can be provided as one control unit provided in an in-vehicle control system as discussed with reference to FIG. 3. In this case, the control system may perform the operations as discussed above for the VCS in the performance layer 210 and the operational layer 230, and the IVCL in the safety layer.

Figure 3:
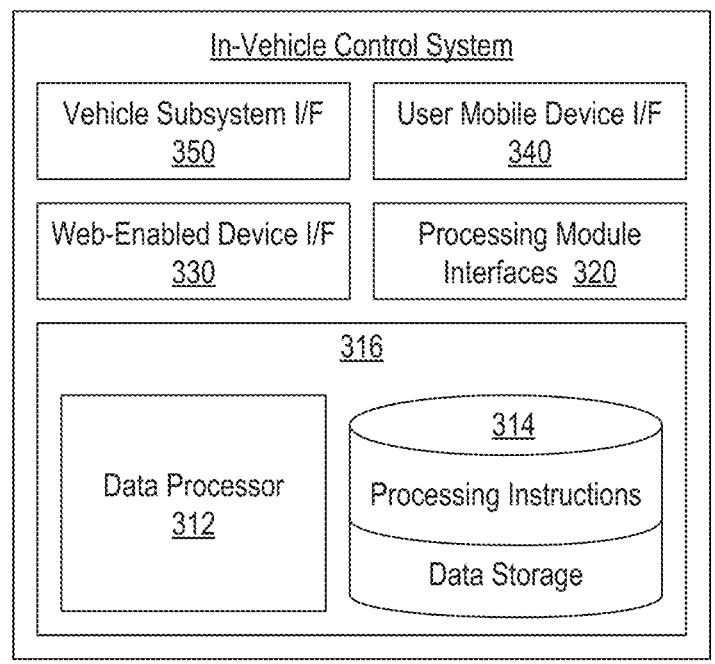
FIG. 3 shows an example of a schematic diagram illustrating an in-vehicle control system based on some implementations of the disclosed technology.

FIG. 3 shows the example diagram illustrating an in-vehicle control system. The in-vehicle control system may receive data from the sensors in the sensor system of the vehicle and use real-time extracted object features obtained from real-time analyses to safely and efficiently navigate and control the vehicle. The real-time scenario analysis can be performed by various manners using machine learning/artificial intelligence (AI) applications that perform various types of data analysis to automate analytical model building. For example, the machine learning/AI applications employ algorithms to evaluate feedback data from the sensor system and suggest recommendations for the implementation of the sensor system. The machine learning/AI applications also can consider various real time conditions, including how many vehicles are on the road and weather conditions that can affect to measurements of sensors in the vehicle. By applying the machine learning/AI applications to the sensor system suggested in this patent documents, it is possible to keep improving the algorithms for controlling the vehicle.

The in-vehicle control system can be configured to include a data processor 312 for processing data received from one or more of the sensors of the sensor system. The data processor 312 can be combined with a data storage device 314 as part of a computing system 316 of the in-vehicle control system. The data storage device 314 can be used to store data, processing parameters, and data processing instructions. A processing module interface 320 can be provided to facilitate data communications between the data processor 312. In various examples, a plurality of processing modules can be provided for execution by data processor 312. Software can be integrated into the in-vehicle control system, optionally downloaded to the in-vehicle control system, or deployed separately from the in-vehicle control system.

The in-vehicle control system can be configured to receive or transmit data from/to a wide-area network and network resources connected thereto. A web-enabled device interface 330 can be used by the in-vehicle control system to facilitate data communication between the in-vehicle control system and the network via one or more web-enabled devices. Similarly, a user mobile device interface 340 can be used by the in-vehicle control system to facilitate data communication between the in-vehicle control system 150 and the network via one or more user mobile devices. The in-vehicle control system can obtain real-time access to network resources via network. The network resources can be used to obtain processing modules for execution by data processor 312, data content to train internal neural networks, system parameters, or other data. The in-vehicle control system can include a vehicle subsystem interface 350. The vehicle subsystem interface 350 may support communications from the vehicle subsystems, such as the sensor systems shown in FIGS. 1 and 2, electronic control units (ECUs), and subsystem that support monitoring or control of vehicle subsystems, including the engine, brakes, steering, transmission, electrical system, emissions system, and interior environment.

Referring back to FIG. 2, each of the performance layer, the operational layer, and the safety layer may contain a set of sensors and a transmitter to which the sensors are connected. The transmitter can be provided for each sensor or multiple sensors in the sensor system to transmit sensor data to the in-vehicle control system. In some implementations, the in-vehicle control system provides control signals to sensing devices based on categorization information indicating groups to which the sensing devices belong. The categorization information of each sensor in the sensor system may be stored in the data storage or separately provided from an additional element. In some implementations, the in-vehicle control system can provide the control signals to the sensing devices based on a desired level for the operation of the vehicle that is obtained based on a real-time analysis. If the desired level for the operation of the vehicle corresponds to the certain level of autonomy, the in-vehicle control system can provide one or more control signals to operate one or more sensors in the performance layer. If the desired level for the operation of the vehicle corresponds to a fail-operational mode, the in-vehicle control system can provide one or more control signals to operate one or more sensors in the operational layer. If the desired level for the operation of the vehicle corresponds to the safe stop mode, the in-vehicle control system can allow the independent vehicle control logic to control the sensors in the safety layer. In some implementations, both of the in-vehicle control system and the independent vehicle control logic can operate together to control the sensors in the safety layer. In some implementations, only the independent vehicle control logic controls the sensors in the safety layer.

FIG. 4 shows an example table including classification information of cameras located at the vehicle. The cameras located at the vehicle are configured for the primary perception of the vehicle, night assistance, 360 degree near range view, monitoring of surroundings, etc. The 'Priority' column 410 of the table shows the classification information, for example, whether a corresponding camera is classified as belonging to the performance layer 210 or the operational layer 230. The 'Priority' column 410 indicates an importance level as to how important a corresponding sensor is to the autonomous driving operation. The 'Type and range' column 420 of the table indicates whether a corresponding camera is a short-range camera (indicated as 'S' in the table), a near-range camera (indicated as 'N' in the table), a middle-range camera (indicated as 'M' in the table), a long range camera (indicated as 'L' in the table), an infrared long-range camera (indicated as 'Infrared L' in the table), an infrared middle-range camera (indicated as 'Infrared M' in the table), or a Fisheye camera. The Fisheye camera is capable of providing surveillance with dynamic viewing angles, including panoramic 180 degrees and 360 degrees. In the example, the long-range corresponds to 50 m to 1000 m, the middle-range corresponds to 30 m to 350 m, the short range corresponds to 5 m to 150 m, and the near range corresponds to 0.1 m to 30 m. The 'No.' column 402 of the table indicates sensor identification numbers assigned to the cameras belonging to the performance layer or the operational layer 230. The 'No.r' column 404 of the table indicates sensor identification numbers assigned to the cameras belonging to the safety layer performance layer or the operational layer 250.

Figure 5A:
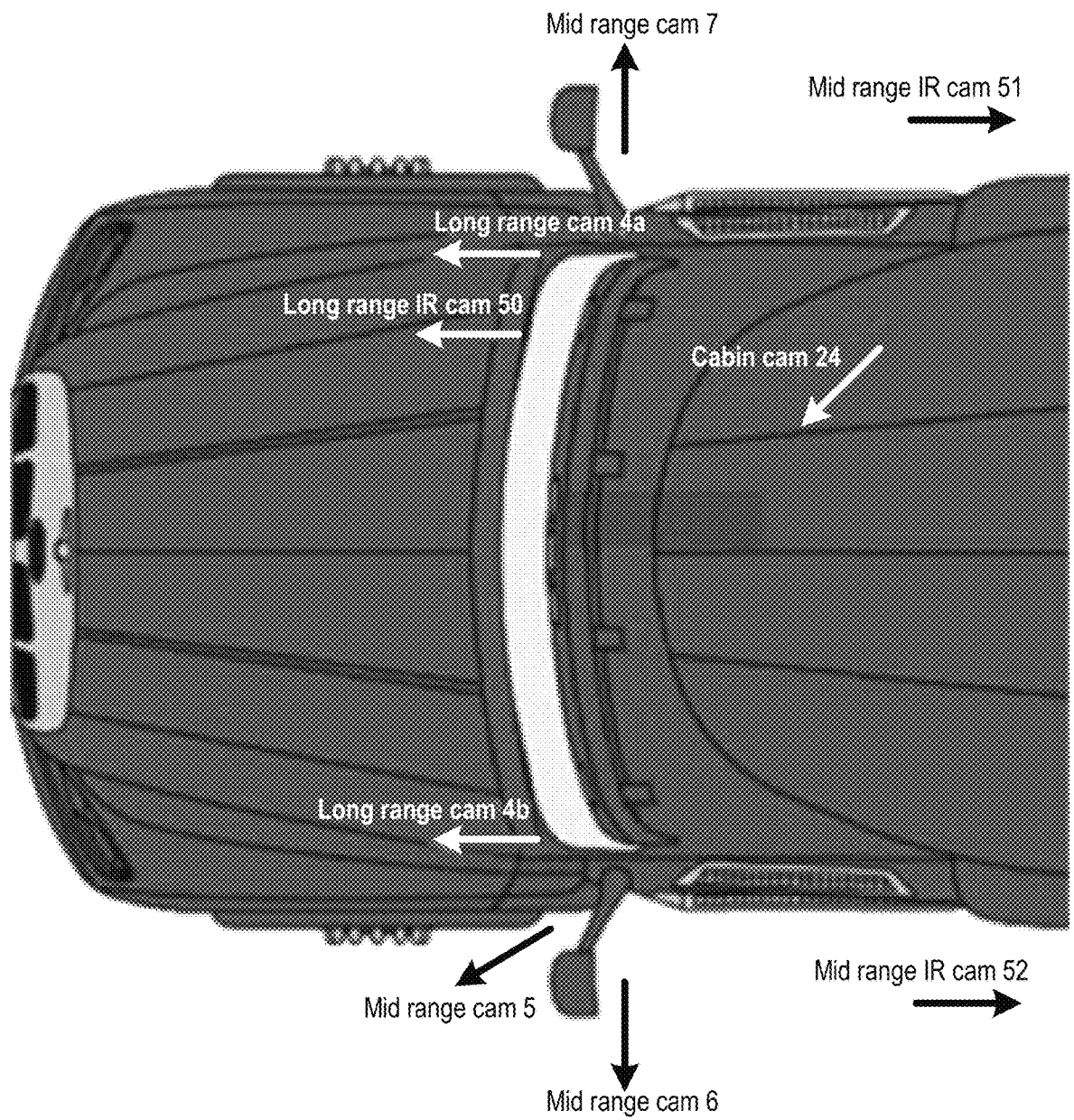
FIGS. 5A and 5B show schematic views of a vehicle with cameras classified as a performance layer and an operational layer, respectively, based on some implementations of the disclosed technology.
Figure 5B:
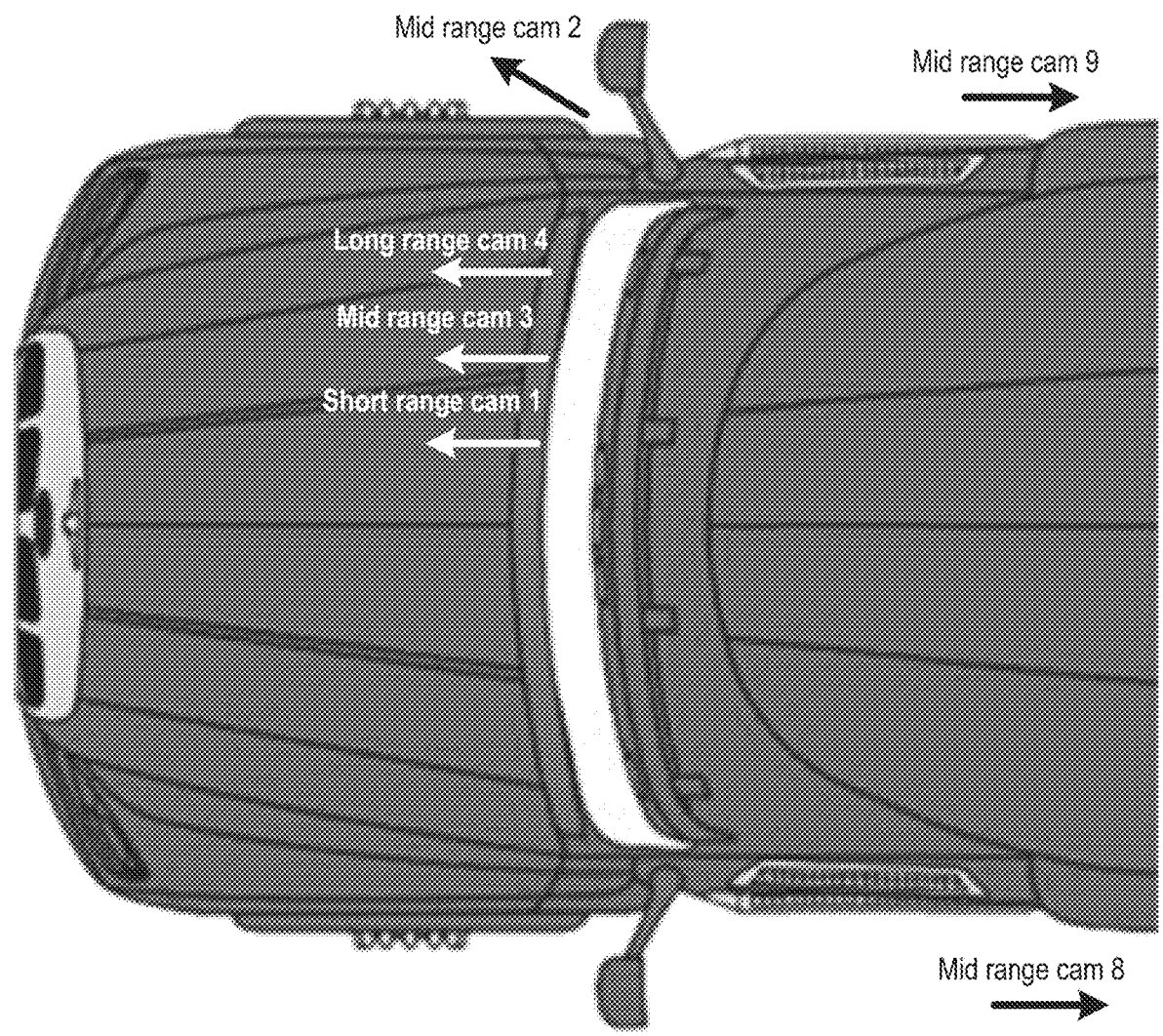

FIGS. 5A and 5B show schematic views of a vehicle with some cameras classified as belonging to a performance layer 210 and an operational layer 230, respectively. In FIGS. 5A and 5B, the arrows indicate facing directions of the cameras and the reference numbers of the cameras correspond to the numbers included in the number column 402 of the table as provided in FIG. 4. Referring to FIGS. 4 and 5A, the mid-range cameras 5, 6 and 7, the mid-range IR cameras 51 and 52, the cabin camera 24, the long-range cameras 4a and 4b and the long-range IR camera 50 are included in the performance layer 210. In the example, the long-range infrared cameras for the front has 18 mm lens and field of view (FOV) of 24°. The long-range IR camera 50 and the mid-range IR cameras 51 and 52 may correspond to the night assistant cameras included in the performance layer 210 as shown in FIG. 2. The mid-range cameras 5, 6 and 7 may correspond to the perception cameras included in the performance layer 210 as shown in FIG. 2. The long-range cameras 4a and 4b form a long range stereo system and back up for each other and may correspond to the stereo cameras included in the performance layer 210 as shown in FIG. 2.

In the example of FIG. 5B, the short-range camera 1, the mid-range cameras 2, 3, 8, 9, and the long range camera 4 are included in the operational layer 230. In the example, the long-range infrared cameras for the front has 18 mm lens and 24 FOV. The short-range camera 1, the mid-range cameras 2, 3, 8, 9 and the long range camera 4 correspond to the perception cameras included in the operational layer 230 as shown in FIG. 2.

FIG. 6 shows an example table including classification information of LiDAR devices located at the vehicle. The LiDAR devices located at the vehicle are configured for the surrounding perception of the vehicle, long-range and near-range detections. The 'Priority' column 610 of the table shows the classification information, for example, whether a corresponding LiDAR device is classified as belonging to the performance layer 210 or the O-sub layer 230. The front long-range LiDAR device, the left rear long-range LiDAR device, the right rear long-range LiDAR device may correspond to the long range LiDAR devices included in the performance layer 210 as shown in FIG. 2. The left LiDAR device and the right LiDAR device may correspond to the primary perception LiDAR devices included in the O-sub layer 230 as shown in FIG. 2. The rear left LiDAR device and the rear right LiDAR device, which are indicated as backup in the 'Priority' column 610, may correspond to the backup perception LiDAR devices in the operational layer 230 of FIG. 2.

Figure 7A:
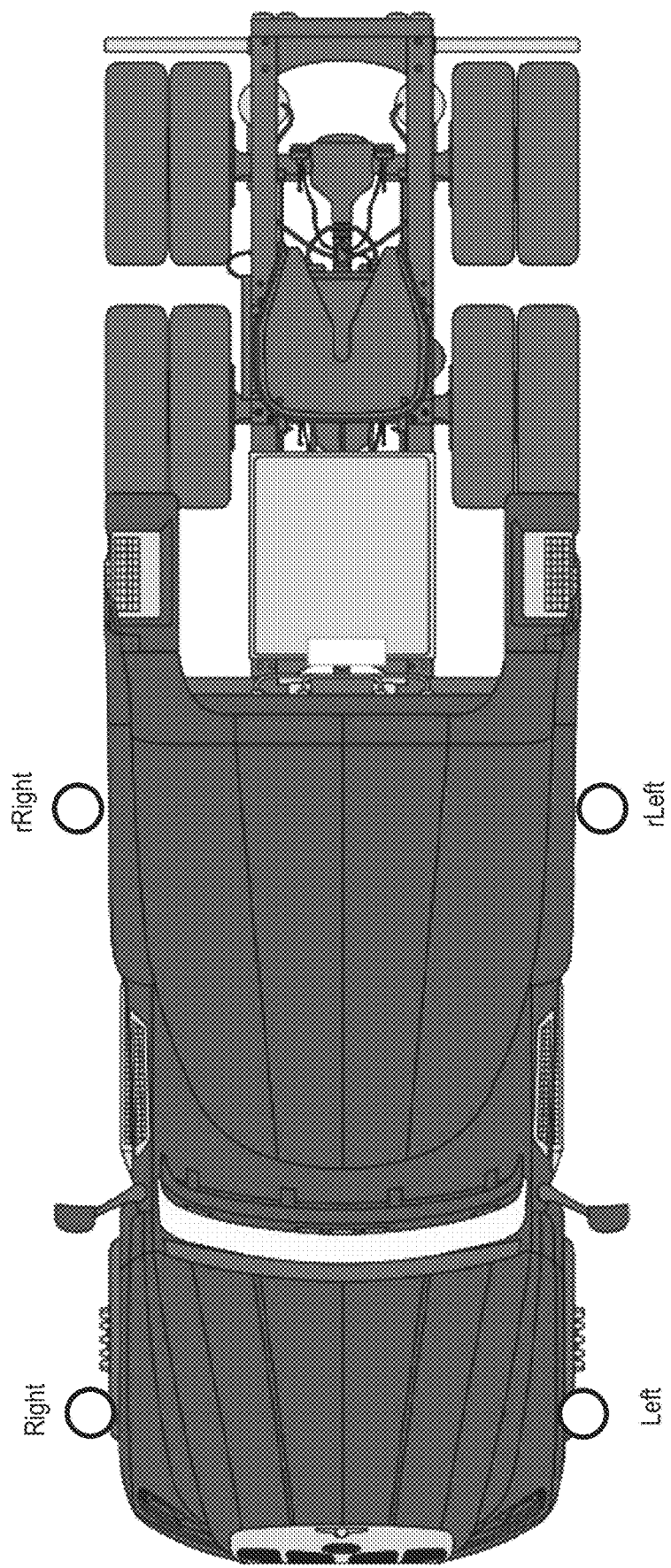
FIGS. 7A to 7C show schematic views of a vehicle with LiDAR devices classified as a performance layer and an operational layer based on some implementations of the disclosed technology.
Figure 7B:
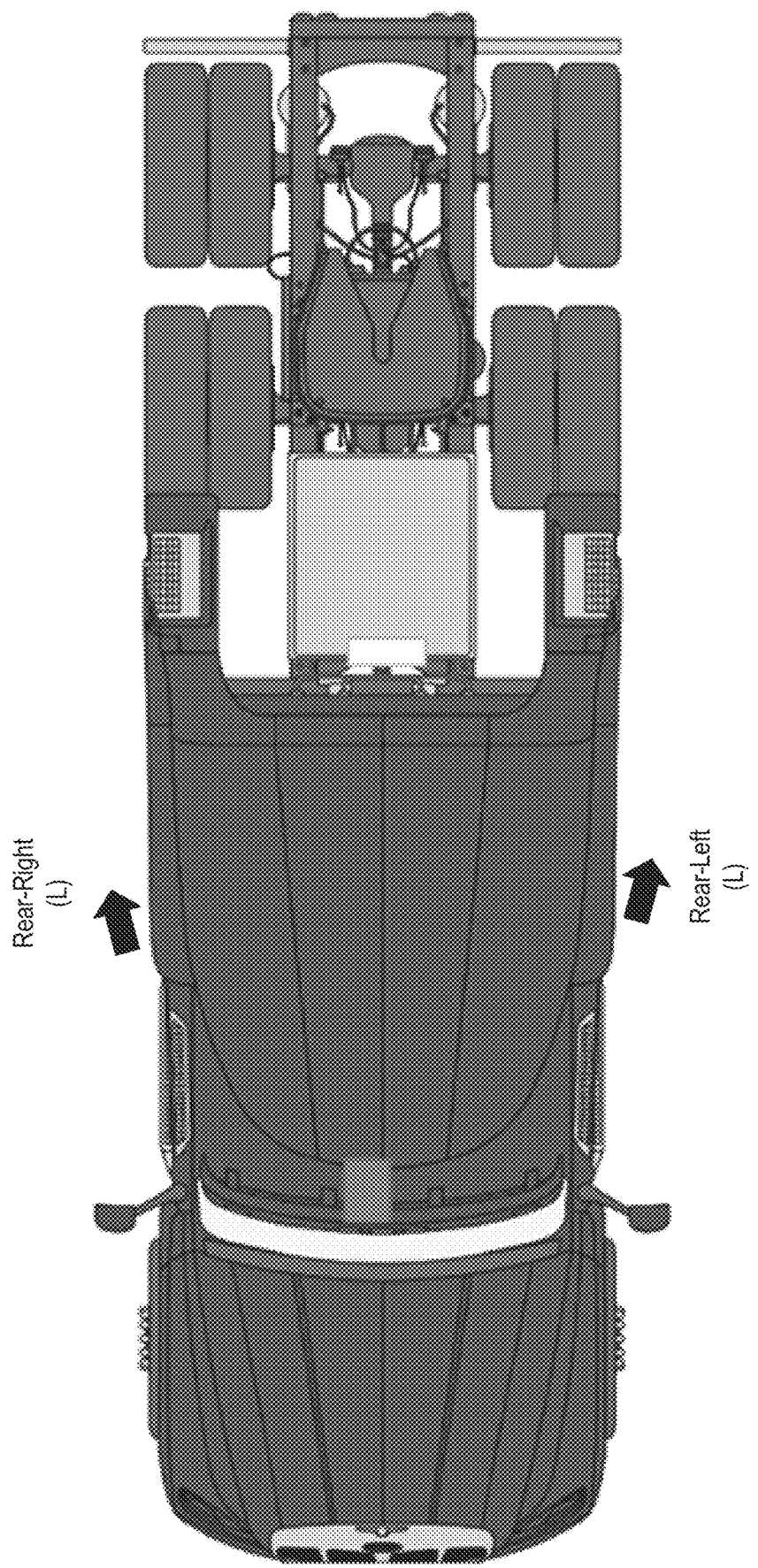
Figure 7C:
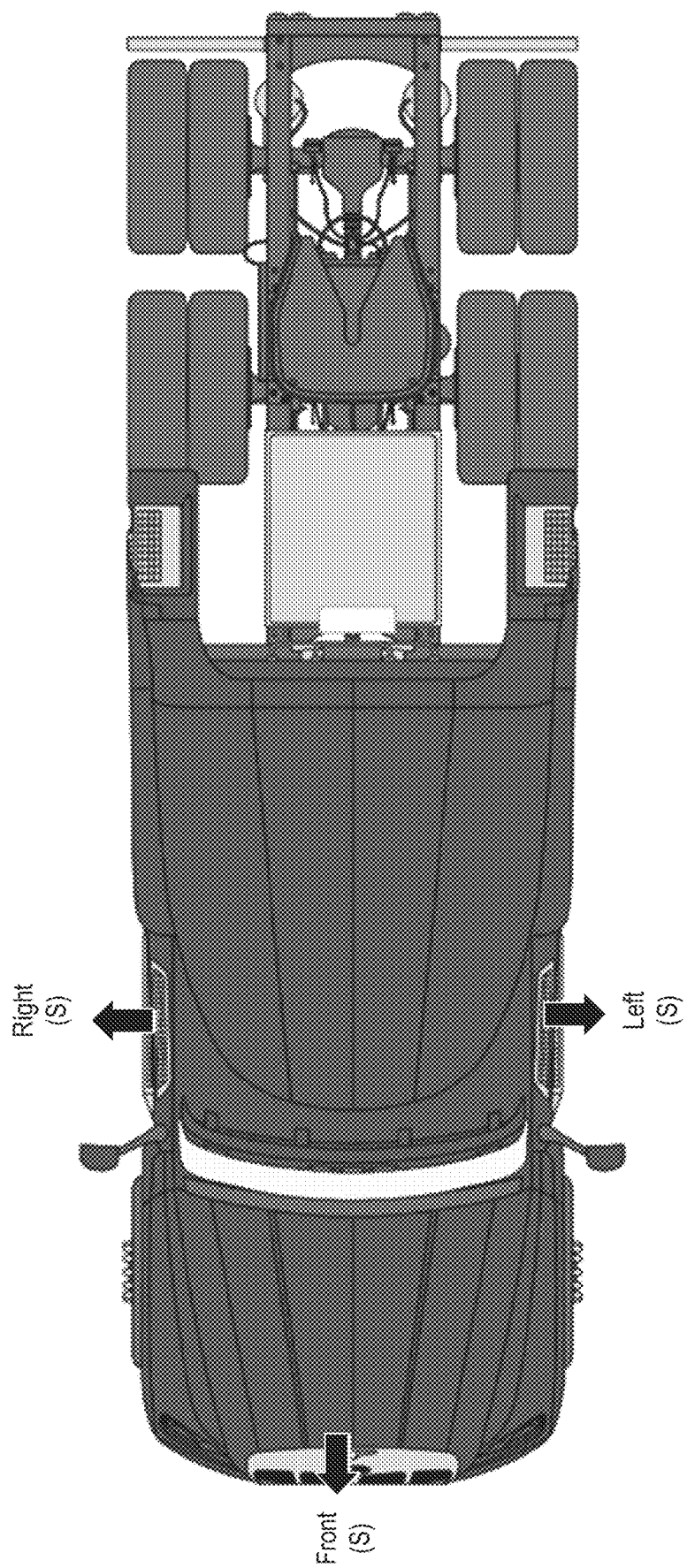

FIG. 7A shows a schematic view of a vehicle with the right LiDAR device, the rear right LiDAR device, the left LiDAR device, and the rear left LiDAR device that may be classified as belonging to the operational layer 230. FIG. 7B shows a schematic view of a vehicle with the left rear long range LiDAR device and the right rear long range LiDAR device that may be classified as belonging to the performance layer 210. FIG. 7C shows a schematic view of a vehicle with the front near range LiDAR device, the left near range LiDAR device, the right near range LiDAR device that may be classified as belonging to the P-sub layer 210.

FIG. 8 shows an example table including classification information of radars located at the vehicle. The radars located at the vehicle are classified as belonging to the performance layer 210 and configured to detect the speed and range of objects in the vicinity of the vehicle using radio signals. In some implementations, in addition to sensing the object, the radar may additionally be configured to sense the speed and the heading of the object.

Figure 9:
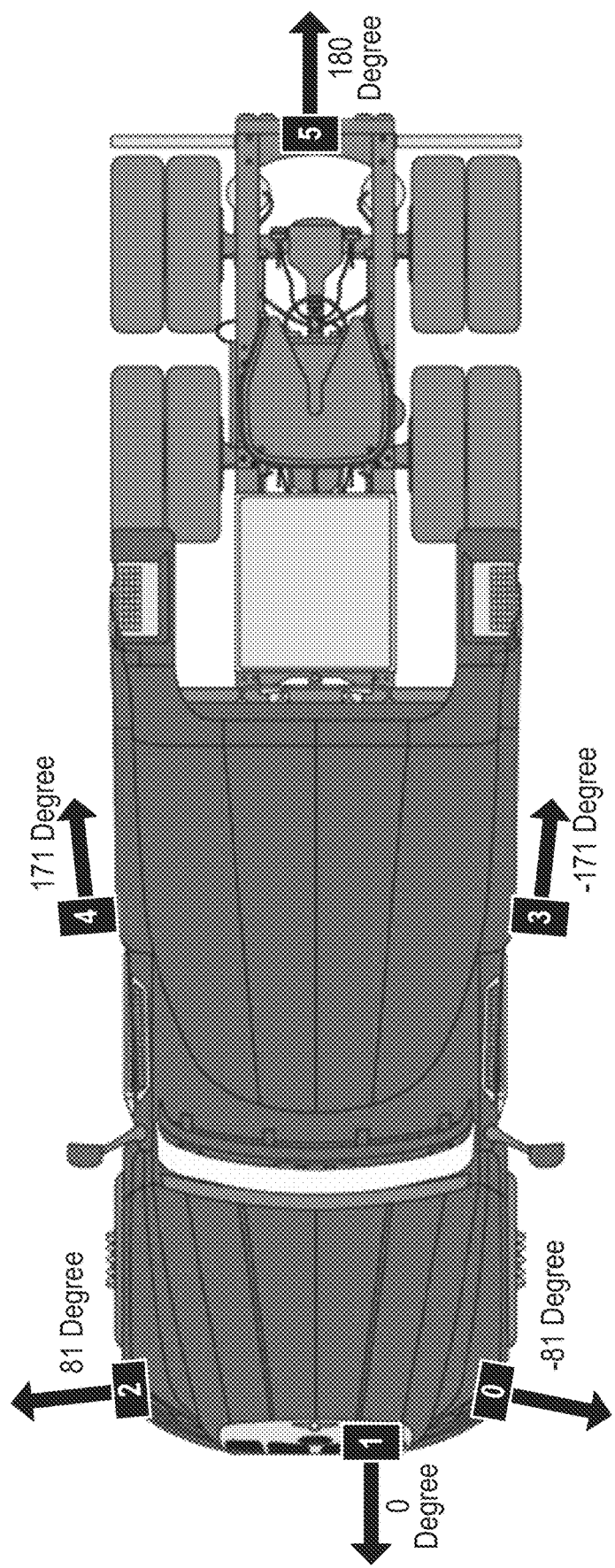
FIG. 9 shows a schematic view of a vehicle with radars classified as a performance layer based on some implementations of the disclosed technology.

FIG. 9 shows a schematic view of a vehicle with the left radar, the front radar, the right radar, the left rear radar, the right rear radar, and the rear radar, which may be classified as belonging to the performance layer 210.

Figure 10:
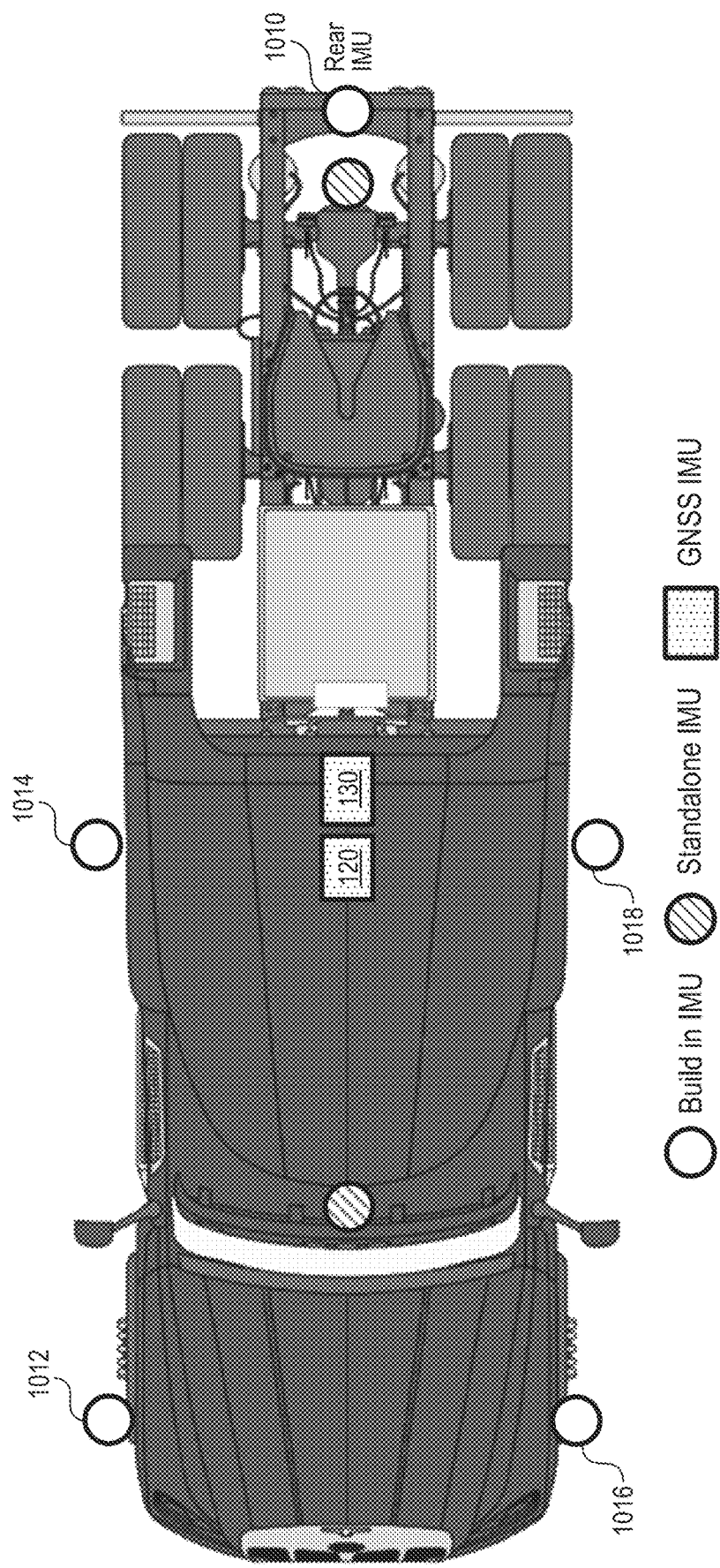
FIG. 10 shows a schematic view of a vehicle with a global navigation satellite system (GNSS) and an inertial measurement unit (IMU) that are classified as a safety layer based on some implementations of the disclosed technology.

FIG. 10 shows a schematic view of a vehicle with a GNSS and an IMU that may be classified as belonging to an operational layer 230. GNSS uses signals from orbiting satellites to compute position, time and velocity of the vehicle. GNSS navigation may be provided through an antenna having a line of sight visibility to at least four satellites. When the line of sight to satellites is blocked by obstructions such as trees or buildings, GNSS navigation may become unreliable or impossible. An IMU may operate as a sensor which represents sensitivity in the force and rotation and provides rotation and acceleration information to compute a relative position over time. In some implementations of the disclosed technology, the IMU may operate to detect a collision and/or roll-over. For collision detection, the IMU can operate as the primary collision detection sensor together with other sensors such as a camera. For example, in FIG. 10, the rear IMU 1010 operates to detect a collision and/or roll-over. The rear IMU 1010 is provided for rear-down perception and combined with the primary perception camera. The built-in IMUs 1012, 1014, 1016 and 1018 are provided for the right LiDAR device, the rear right LiDAR device, the left LiDAR device, and the rear left LiDAR device, respectively. The data processor and/or data storage (see FIG. 3) may include algorithms for detecting collision and roll-over based on data from the IMUs, steering angle, vehicle speed, etc. The GNSS/IMUs 1020 and 1030 operates such that one of the GNSS/IMUs 1020 and 1030 becomes primary and the other one of the GNSS/IMUs 1020 and 1030 is backup.

Figure 11:
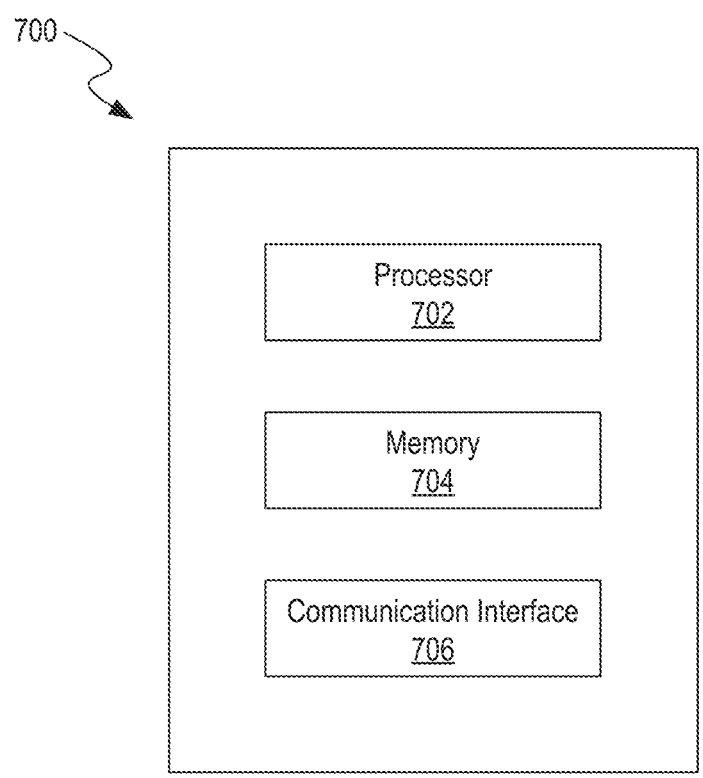
FIG. 11 shows an example of a hardware platform that can implement some techniques described in the present document.

FIG. 11 shows an example of a hardware platform 700 that can be used to implement some of the techniques described in the present document. For example, the hardware platform 700 may implement the various modules described herein. The hardware platform 700 may include a processor 702 that can execute code to implement a method. The hardware platform 700 may include a memory 704 that may be used to store processor-executable code and/or store data. The hardware platform 700 may further include a communication interface 706. For example, the communication interface 706 may implement automotive ethernet and/or controller area network (CANbus).

Figure 12:
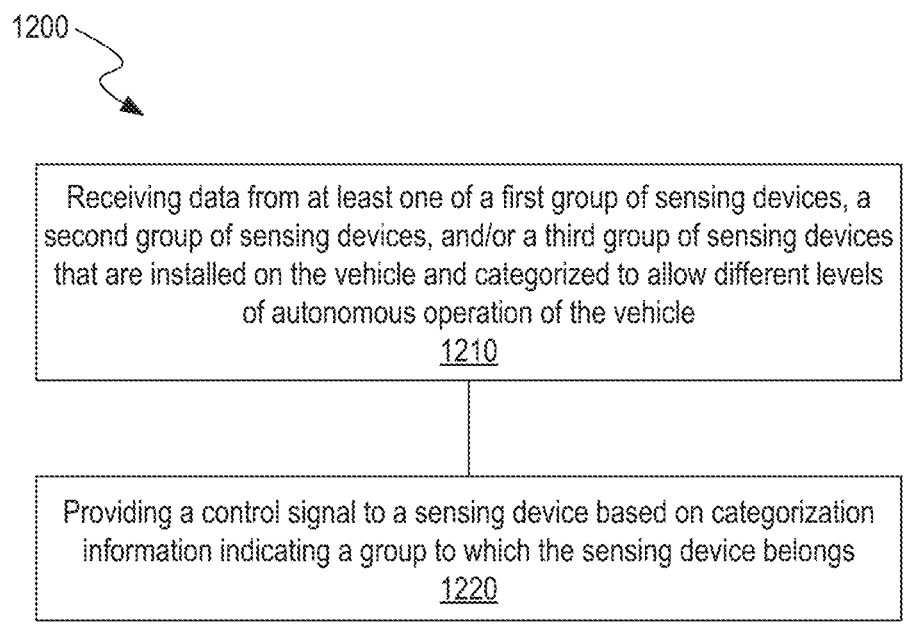
FIG. 12 shows an example method for assisting in operating a vehicle based on some implementations of the disclosed technology.

FIG. 12 shows an example method for assisting in operating a vehicle. The method 1200 includes, at the operation 1210, data is received from at least one of a first group of sensing devices, a second group of sensing devices, and/or a third group of sensing devices that are installed on the vehicle and categorized to allow different levels of autonomous operation of the vehicle. In the example, data is received from the first group of sensing devices, the second group of sensing devices, or the third group of sensing devices. In the example, data is received from any two groups among the first to third groups of sensing devices. In the example, data is received from the first group of sensing devices, the second group of sensing devices, and the third group of sensing devices. The first group of sensing devices, the second group of sensing devices, and the third group of sensing devices correspond to the performance layer 210, the operational layer 230, and the safety layer 250. The method 1200 further includes, at the operation 1220, a control signal is provided to a sensing device based on categorization information indicating a group to which the sensing device belongs. In some implementations, the method 1200 further includes: determining a failure of the first group of sensing devices and allowing the second group of sensing devices to control the operation of the vehicle. In some implementations, the method 1200 further includes determining a failure in at least one of the first group of sensing devices or the second group of sensing devices and allowing the third group of sensing devices to control the operation of the vehicle. In some implementations, the method 1200 further includes: in response to the safe stop maneuver of the vehicle: issuing an emergency assistance request to a service provider.

Embodiments of the disclosed technology provide a system installed in a vehicle, comprising: a first group of sensing devices configured to allow a first level of autonomous operation of the vehicle; a second group of sensing devices configured to allow a second level of autonomous operation of the vehicle, the second group of sensing devices including primary sensing devices and backup sensing devices; a third group of sensing devices configured to allow the vehicle to perform a safe stop maneuver; and a control element communicatively coupled to the first group of sensing devices, the second group of sensing devices, and the third group of sensing devices, the control element being configured to: receive data from at least one of the first group of sensing devices, the second group of sensing devices, and/or the third group of sensing devices, and provide a control signal to a sensing device based on categorization information indicating a group to which the sensing device belongs.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A sensor system installed in a vehicle, wherein the sensor system includes three layers, comprising:
    a first group of sensing devices configured to allow a first level of autonomous operation of the vehicle, including an advanced perception camera, a stereo camera, a night assistant camera, and a near range camera, multiple radars and a long range LiDAR device;
    a second group of sensing devices configured to allow a second level of autonomous operation of the vehicle, the second group of sensing devices including primary sensing devices and backup sensing devices, wherein the second group of sensing devices includes a primary perception camera, a back-up perception camera, a primary perception LiDAR device, a back-up perception LiDAR device, a primary GNSS/IMU (global navigation satellite system/inertial measurement unit), and a back-up GNSS/IMU;
    a third group of sensing devices configured to allow the vehicle to perform a safe stop maneuver, the third group of sensing devices including an independent vehicle control logic configured to detect an occurrence of a failure in at least one of the first group of sensing devices and the second group of the sensing devices based on predetermined rules, wherein the third group of sensing devices includes a safe stop camera, a safe stop radar, and an independent OD (object detection) ECU (electronic control unit); and
    a control element communicatively coupled to the first group of sensing devices, the second group of sensing devices, and the third group of sensing devices, the control element to:
        receive data from at least one of the first group of sensing devices, the second group of sensing devices, or the third group of sensing devices,
        determine a desired level for operation of the vehicle based on analysis of the received data performed by an algorithm, and
        provide a control signal to a sensing device based on the desired level and categorization information indicating a group to which the sensing device belongs,
    wherein the independent vehicle control logic is to bring the vehicle to a safe stop in response to a determination that a subset of sensing devices in the second group of sensing devices are unavailable to allow the vehicle to safely operate in an operational mode associated with the first group of sensing devices or the third group of sensing devices.

2. The system of claim 1, wherein the cameras and radars in the first group of sensing devices are configured to detect one or more objects near the vehicle, and the long range LiDAR is configured to measure distances between the vehicle and the one or more objects.

3. The system of claim 1, wherein the primary camera, and the primary perception LiDAR are configured to detect surrounding areas of the vehicle, the primary GNSS is configured to provide position information, and the primary IMU is configured to provide rotation and acceleration information.

4. The system of claim 3, wherein backup sensing devices are turned on to operate in response to a failure of the primary sensing devices.

5. The system of claim 3, wherein the control element is to detect a collision or roll over of the vehicle based on at least one of the primary GNSS or the primary IMU.

6. The system of claim 4, wherein the control element is to detect a collision or roll over of the vehicle based on at least one of the backup GNSS or the backup IMU.

7. The system of claim 1, wherein the third group of sensing devices includes a vehicle control unit to:
    perform a stand-alone object detection, and
    cause the vehicle to perform a safe stop maneuver based on a result of the stand-alone object detection.

8. The system of claim 1, wherein the control element includes an artificial intelligence algorithm applied to provide the control signal.

9. A sensor system installed in a vehicle, wherein the sensor system includes three layers, comprising:
    a first group of sensing devices, including an advanced perception camera, a stereo camera, a night assistant camera, and a near range camera, multiple radars and a long range LiDAR device, configured to allow N autonomous maneuvers operable during an operation of the vehicle, N being a natural number;
    a second group of sensing devices configured to allow M autonomous maneuvers operable during the operation of the vehicle, M being a natural number that is less than N, wherein the second group of sensing devices includes a primary perception camera, a back-up perception camera, a primary perception LiDAR device, a back-up perception LiDAR device, a primary GNSS/IMU (global navigation satellite system/inertial measurement unit), and a back-up GNSS/IMU;

a third group of sensing devices including a vehicle control logic to detect an occurrence of a failure in at least one of the first group of sensing devices or the second group of the sensing devices and allow the vehicle to perform a safe stop maneuver, wherein the third group of sensing devices includes a safe stop camera, a safe stop radar, and an independent OD (object detection) ECU (electronic control unit); and a control element communicatively coupled to the first group of sensing devices, the second group of sensing devices, and the third group of sensing devices, the control element to provide a control signal to a sensing device based on categorization information indicating a group to which the sensing device belongs, wherein sensing devices belonging to the second group are configured to perform operations of the first group based on the control signal, wherein the vehicle control logic is to bring the vehicle to a safe stop in response to a determination that a subset of sensing devices in the second group of sensing devices are unavailable to allow the vehicle to safely operate in an operational mode associated with the first group of sensing devices or the third group of sensing devices.

10. The system of claim 9, wherein the groups of sensing devices are in communication with independent vehicle control logic to issue a request for emergency assistance based on an occurrence of the failure in the at least one of the first group of sensing devices or the second group of sensing devices.

11. The system of claim 9, wherein the first group of sensing devices includes a first vehicle control unit to monitor the first group of sensing devices and determine a failure in the first group of sensing devices.

12. The system of claim 11, wherein the second group of sensing devices includes a second vehicle control unit to monitor the first vehicle control unit and take over control of the vehicle in response to detecting the failure in the first group of sensing devices.

13. The system of claim 12, wherein the vehicle control logic of the third group of sensing devices is configured to monitor the first vehicle control unit and the second vehicle control unit and take over control of the vehicle in response to detecting an occurrence of the failure in the at least one of the first group of sensing devices or the second group of sensing devices.

14. The system of claim 9, wherein the second group of sensing devices include primary sensing devices and backup sensing devices turned on to operate in response to a failure of the primary sensing devices.

15. The system of claim 14, wherein the control element is further to detect a collision or roll over of the vehicle based on at least one of the primary sensing devices or at least one of the backup sensing devices.

16. A computer-implemented method for assisting in operating a vehicle, comprising:

receiving data from at least one of a first group of sensing devices, a second group of sensing devices, or a third group of sensing devices that are installed on the vehicle and categorized to allow different levels of autonomous operation of the vehicle, wherein at least one of the levels of autonomous operation comprises the vehicle requesting an operator to intervene in controlling one or more driving operations of the vehicle;

providing a control signal to a sensing device based on categorization information indicating a group to which the sensing device belongs, and wherein the first group of sensing devices include first sensing devices that operate to accomplish a level of autonomous operation of the vehicle based on the categorization information, including an advanced perception camera, a stereo camera, a night assistant camera, and a near range camera, multiple radars and a long range LiDAR device, the second group of sensing devices include second sensing devices that operate to accomplish a lower level of autonomous operation of the vehicle relative to the level of autonomous operation of the first group, wherein the second group of sensing devices includes a primary perception camera, a back-up perception camera, a primary perception LiDAR device, a back-up perception LiDAR device, a primary GNSS/IMU (global navigation satellite system/inertial measurement unit), and a back-up GNSS/IMU, and the third group of sensing devices include third sensing devices that operate to perform a safe stop maneuver, wherein the third group of sensing devices includes a safe stop camera, a safe stop radar, and an independent OD (object detection) ECU (electronic control unit), wherein the stop maneuver is initiated using independent vehicle control logic to bring the vehicle to a stop if at minimum a single vehicle control unit monitoring the performance of sensing devices fails.

17. The computer-implemented method of claim 16, further comprising:

determining a failure of the first group of sensing devices and allowing the second group of sensing devices to control the operation of the vehicle.

18. The computer-implemented method of claim 16, further comprising:

determining a failure in at least one of the first group of sensing devices or the second group of sensing devices and allowing the third group of sensing devices to control the operation of the vehicle.

19. The computer-implemented method of claim 18, further comprising, in response to the safe stop maneuver of the vehicle:

issuing an emergency assistance request to a service provider.

* * * * *